J. DAVIDSON.
VALVE GEAR FOR STEAM ENGINES.
APPLICATION FILED MAY 20, 1911.
1,050,618.
Patented Jan. 14, 1913.
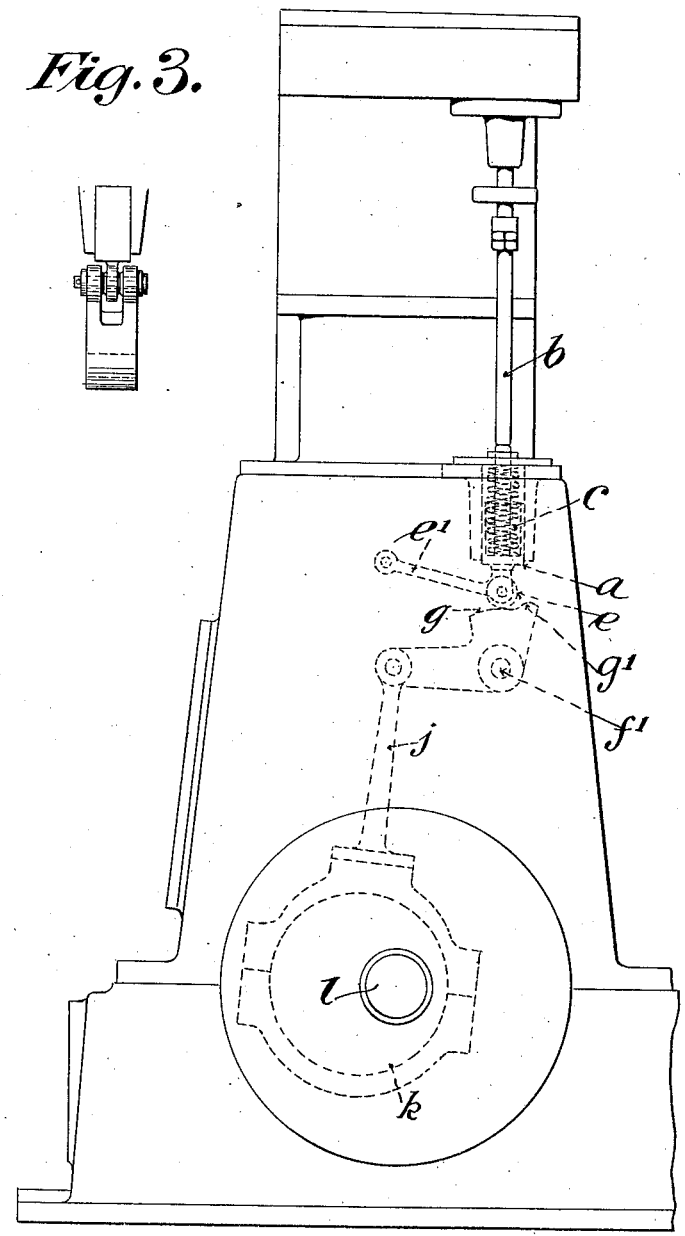
Witnesses.
N. Meem
G. M. Kaufman
Inventor.
John Davidson
Per Mason Fenwick & Lawrence,
Attorneys

UNITED STATES PATENT OFFICE.

JOHN DAVIDSON, OF PENDLETON, ENGLAND.

VALVE-GEAR FOR STEAM-ENGINES.

1,050,618. Specification of Letters Patent. Patented Jan. 14, 1913.

Application filed May 20, 1911. Serial No. 628,372.

*To all whom it may concern:*

Be it known that I, JOHN DAVIDSON, subject of the King of Great Britain, residing at Pendleton, in the county of Lancaster, Kingdom of Great Britain, have invented certain new and useful Improvements in Valve-Gear for Steam-Engines; and I do hereby declare the following to be a full, clear, and exact description of the invention, such as will enable others skilled in the art to which it appertains to make and use the same.

This invention relates to improvements in or applicable to the valve gear in high speed vertical engines of the type in which drop valves, combined drop and piston valves or single piston valves are employed.

The object of my invention is to enable the valves in engines of the class hereinbefore named to be actuated direct from the crank shaft. I attain this object by the mechanism illustrated in the accompanying drawing, in which—

Figure 1 is an end view of an engine provided with my improvements, and Figs. 2 and 3 are detached views of Fig. 1.

Similar letters refer to similar parts throughout the several views.

In carrying out my invention and referring to Figs. 1, 2 and 3, the said valve is operated from a plunger $a$, which is free to slide in a guide box, but is not connected thereto: I fit a roller $e$ carried at the end of a link $e'$ at the bottom end of the plunger $a$ said roller resting on a cam formed on one end of a pivoted lever, whose opposite end is connected to the rod $j$ of an eccentric $k$ that is fitted on the crank shaft $l$; the plunger $a$ is lifted and the valve opened by the projection $g'$ on the cam $g$ when said cam is oscillated by the action of the eccentric $k$ on the driving shaft, the other portion of the cam being formed to a radius from the center $f'$. A coil spring $c$ is fitted on the spindle of the plunger $a$ to keep the plunger always in contact with the cam $g$; two or more valves may be alternately actuated in like manner by placing an additional eccentric on the crankshaft $l$ or on a counter shaft, or several cams may be fitted to the shaft $f'$ and oscillated by the same eccentric. The cam $g$ is formed with a groove in the center as shown in Figs. 2 and 3, and three rollers connected to the end of the pivoted lever $e'$, the plunger $a$ resting on the center roller.

I claim:

In a high speed vertical steam engine, a mechanism for actuating the steam inlet valves from the crank shaft, comprising a plunger in operative connection with the inlet valve, a cam below the said plunger having a part formed radial to its center, a projection at one end and a groove in its periphery, a link with stationary fulcrum and three rollers at its free end, the middle one running in contact with the lower end of the said plunger and the two outer ones with the periphery of the said cam, an eccentric on the crank shaft and means connecting the said eccentric with the said cam to oscillate the latter, all combined substantially as and for the purpose set forth.

In testimony whereof I have affixed my signature in presence of two witnesses.

JOHN DAVIDSON.

Witnesses:
FERDINAND B. BOSSHARDT,
STANLEY E. BRAMALL.

---

Copies of this patent may be obtained for five cents each, by addressing the "Commissioner of Patents, Washington, D. C."